United States Patent
Yun

(10) Patent No.: US 9,215,398 B2
(45) Date of Patent: *Dec. 15, 2015

(54) DISPLAY APPARATUS FOR DISPLAYING VIDEO INPUT THROUGH VARIOUS PORTS

(75) Inventor: Young-kyan Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 573 days.

This patent is subject to a terminal disclaimer.

(21) Appl. No.: 13/490,964

(22) Filed: Jun. 7, 2012

(65) Prior Publication Data

US 2012/0307143 A1      Dec. 6, 2012

Related U.S. Application Data

(63) Continuation of application No. 11/938,892, filed on Nov. 13, 2007, now Pat. No. 8,212,921.

(30) Foreign Application Priority Data

Mar. 29, 2007  (KR) .......................... 10-2007-0030940

(51) Int. Cl.
*H04N 7/00*   (2011.01)
*H04N 11/00*  (2006.01)
(Continued)

(52) U.S. Cl.
CPC ............... *H04N 5/64* (2013.01); *G06F 3/1431* (2013.01); *G09G 5/006* (2013.01); *G09G 2330/06* (2013.01); *G09G 2370/04* (2013.01); *G09G 2370/20* (2013.01)

(58) Field of Classification Search
CPC .. G06F 3/1431; G09G 5/006; G09G 2370/20; G09G 2370/04; G09G 2330/06
USPC .......................................................... 348/836
See application file for complete search history.

(56) References Cited

U.S. PATENT DOCUMENTS 6,356,968 B1 *  3/2002  Kishon .................... 710/306
6,600,346 B1 *  7/2003  Macaluso .................. 327/108
(Continued)

FOREIGN PATENT DOCUMENTS

CN   1528621 A     9/2004
JP   2003-76351 A  3/2003
(Continued)

OTHER PUBLICATIONS

Communication dated Nov. 21, 2012, issued by the European Patent Office in counterpart European Patent Application No. 12182147.4.
(Continued)

*Primary Examiner* — Hee-Yong Kim
(74) *Attorney, Agent, or Firm* — Sughrue Mion, PLLC

(57) ABSTRACT

A display apparatus displaying video input through various ports is provided. The display apparatus includes a board which is disposed behind a display module, wherein the board includes a universal serial bus (USB) port which receives a USB standard signal, a decoder which decodes a video signal from the USB standard signal and outputs a decoded signal, a video output unit which outputs a displayable video signal to the display module corresponding to the video signal, wherein the USB port is disposed at an edge of a first side of the board, and the video output unit is disposed at an edge of a second side of the board which is different from the first side of the board.

16 Claims, 6 Drawing Sheets

(51) Int. Cl.
  *H04N 5/64* (2006.01)
  *G06F 3/14* (2006.01)
  *G09G 5/00* (2006.01)

(56) References Cited

U.S. PATENT DOCUMENTS

| | | | |
|---|---|---|---|
| 7,373,650 B1 | 5/2008 | Rodriguez et al. | |
| 2002/0071055 A1 | 6/2002 | Ooshima et al. | |
| 2004/0130505 A1 | 7/2004 | Lee et al. | |
| 2004/0221315 A1* | 11/2004 | Kobayashi | 725/126 |
| 2006/0010259 A1 | 1/2006 | Kang et al. | |
| 2006/0238036 A1* | 10/2006 | Nagata et al. | 307/147 |
| 2007/0004253 A1* | 1/2007 | Lee et al. | 439/92 |
| 2008/0225036 A1* | 9/2008 | Song et al. | 345/213 |
| 2013/0063854 A1* | 3/2013 | Soffer | 361/103 |

FOREIGN PATENT DOCUMENTS

| | | |
|---|---|---|
| KR | 20-0410467 Y1 | 2/2006 |
| KR | 10-0609061 B1 | 7/2006 |

OTHER PUBLICATIONS

Michael K. W. Wu et al; "Development of an Integrated CAD Tool for Switching Power Supply Design With EMC Performance Evaluation"; IEEE Transactions on Industry Applications, XP011022370, vol. 34, No. 2, Apr. 1, 1998, pp. 364-373.

Ge, et al.; "Reliability Design of Printed Circuit Board", Jiangsu Electronics, Dec. 15, 2006, pp. 32-34.

Communication dated Jun. 25, 2014, issued by the State Intellectual Property Office of the People's Republic of China in counterpart Chinese Application No. 200810088118.9.

Communication dated Aug. 18, 2014, issued by the State Intellectual Property Office of the People's Republic of China in counterpart Chinese Application No. 201210034462.6.

Extended European Search Report dated Jun. 18, 2010, issued by the European Patent Office in a counterpart Application No. 08100666.0-1228.

Communication, dated for Jan. 3, 2014, issued by the State Intellectual Property Office of the People's Republic of China in counterpart Chinese Application No. 201210034462.6.

Communication dated Feb. 11, 2015 issued by the State Intellectual Property Office of the People's Republic of China in counterpart Chinese Application No. 201210034462.6.

Communication dated Apr. 17, 2015 issued by European Patent Office in counterpart European Application No. 08100666.0.

Communication dated Sep. 24, 2015 issued by The State Intellectual Property Office of P.R. China in counterpart Chinese Patent Application No. 201210034462.6.

Communication dated Oct. 7, 2015 issued by European Patent Office in counterpart European Patent Application No. 08100666.0.

* cited by examiner

DISPLAY APPARATUS FOR DISPLAYING VIDEO INPUT THROUGH VARIOUS PORTS

CROSS-REFERENCE TO RELATED APPLICATIONS

This is a Continuation Application of U.S. application Ser. No. 11/938,892, filed on Nov. 13, 2007, which claims priority under 35 U.S.C. §119 from Korean Patent Application No. 10-2007-0030940, filed on Mar. 29, 2007, in the Korean Intellectual Property Office, the disclosure of which is incorporated herein by reference in its entirety.

BACKGROUND OF THE INVENTION

1. Field of the Invention

Apparatuses consistent with the present invention relate to a display apparatus, and more particularly, to a display apparatus which provides a user with video according to video data input from an external apparatus.

2. Description of the Related Art

A representative example of display apparatus is a computer display apparatus which displays video transmitted from a computer on a screen.

A display apparatus comprises ports such as a digital visual interface (DVI) port, or a D-subminiature (D-SUB) port to receive video from a computer. Accordingly, a DVI port or D-SUB port is required in a computer to transmit video from the computer to a display apparatus.

The number of DVI ports and D-SUB ports supported by a computer is limited, and therefore, the number of display apparatuses connectable to a computer are also limited. As a result, a problem occurs in that extra hardware (e.g. video cards) having a DVI port or a D-SUB port has to be added.

Additionally, because DVI cables and D-SUB cables, connected to a DVI port or a D-SUB port, respectively, comprise a plurality of lines, the cost is increased.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus displaying a video input through various ports, and a method to connect a plurality of display apparatuses without requiring additional hardware.

According to an aspect of the present invention, there is provided a display apparatus comprising: a board which is disposed behind a display module, wherein the board comprises, a universal serial bus (USB) port which receives a USB standard signal, a decoder which decodes a video signal from the USB standard signal and outputs a decoded signal, a video output unit which outputs a displayable video signal to the display module, corresponding to the video signal, wherein the USB port is disposed at an edge of a first side of the board, and the video output unit is disposed at an edge of a second side which is different from the first side of the board.

The first side and the second side may be opposite to each other.

The display apparatus may comprise a signal converting unit which converts the decoded video signal; and a signal processing unit which converts the converted video signal into the displayable video signal, wherein the decoder, the signal converting unit, and the signal processing unit are adjacently disposed on the board.

The converted video signal may be Transition Minimized Differential Signaling (TMDS) format signal, and the displayable video signal may be a low voltage differential signaling (LVDS) format signal.

A distance between the USB port and the signal converting unit may be shorter than a distance between the USB port and the signal processing unit.

A distance between the USB port and the decoder may be shorter than a distance between the USB port and the signal processing unit The display apparatus may further comprise a power supply circuit board comprising a plurality of power supply circuit elements, wherein the power supply circuit board is spaced apart from the board, and is disposed behind of the display module.

A power output port mounted in the power supply circuit board may be connected with a power input port mounted in the board through a power supply cable.

According to another aspect of the present invention, there is provided a display apparatus comprising a board which is disposed behind a display module, wherein the board comprises: a port which receives a first video signal; a universal serial bus (USB) port which receives a USB standard signal; a decoder which decodes a second video signal from the USB standard signal and outputs a decoded second video signal; a video output unit which outputs a displayable video signal to the display module, corresponding to either the first video signal or the second video signal, wherein the USB port is disposed at an edge of a first side of the board, and the video output unit is disposed at an edge of a second side which is different from the first side of the board.

The USB port and the port may be adjacently disposed, and the first side and the second side may be opposite to each other.

The port may be a digital visual interface (DVI) port.

The display apparatus may comprise a signal converting unit which converts the second video signal into a third video signal; and a signal processing unit which converts at least one of the first video signal and the third video signal into a displayable video signal, wherein the decoder, the signal converting unit, and the signal processing unit are adjacently disposed on the board.

The third video signal may be Transition Minimized Differential Signaling (TMDS) format signal, and the displayable video signal is a low voltage differential signaling (LVDS) format signal.

A distance between the USB port and the decoder may be shorter than a distance between the USB port and the signal processing unit.

A distance between the USB port and the signal converting unit is shorter than a distance between the USB port and the signal processing unit.

The display apparatus may comprise a switching unit which outputs one of the first video signal transmitted from the port and the third video signal transmitted from the signal converting unit to the signal processing unit, wherein the switching unit is mounted on the board, and disposed between the USB port and the signal processing unit.

A distance between the USB port and the switching unit is shorter than a distance between the USB port and the signal processing unit.

A distance between a center of the display apparatus and the USB port may be shorter than a distance between the center of the display apparatus and the port.

The port may be a D-subminiature connectors (D-SUB) port.

The display apparatus may comprise a signal converting unit which converts the second video signal into a third video signal; and a signal processing unit which converts at least one of the first video signal and the third video signal into a displayable video signal, wherein the decoder, the signal converting unit, and the signal processing unit are adjacently disposed on the board.

The first video signal is a red, green, and blue (RGB) format signal, and the third video signal is a LVDS format signal.

A distance between the USB port and the decoder may be shorter than the distance between the USB port and the signal processing unit.

A distance between the USB port and the signal converting unit may be shorter than the distance between the USB port and the signal processing unit.

According to also another aspect of the present invention, there is provided a display apparatus having a display module, the display apparatus comprising a first printed circuit board which is disposed behind of the display module, and comprises a plurality of power supply circuit elements; a second printed circuit board which is adjacently disposed to the first printed circuit board; wherein the second printed circuit board comprises: a USB port which receives a USB standard signal from an external apparatus; a first circuit module which transmits and receives the USB standard signal to and from a second external apparatus; a second circuit module which converts a video signal from the USB standard signal into a predetermined format; and a third circuit module which converts the video signal transmitted from the first circuit module or a third external apparatus into a displayable video signal, and transmits the displayable video signal to the display module, wherein the USB port and the second circuit module are adjacently disposed on the second printed circuit board.

The second circuit module may comprise a decoder which decodes a video signal from the USB standard signal output from the USB port; and a signal converting unit which converts the decoded video signal output from the decoder, wherein the decoder, the signal converting unit, and the USB port are sequentially arranged from top to bottom of the second printed circuit board.

The third circuit module may comprise a switching unit which outputs one of the video signal output from a DVI port and the video signal output from the second circuit module; and a signal processing unit which converts the video signal output from the switching unit into a displayable video signal, wherein the switching unit is disposed in an area defined by the DVI port, the USB port and the signal processing unit.

The first circuit module may be mounted on a different surface from a surface of the second printed circuit board mounting the third circuit module.

The first circuit module may comprise a USB hub which transmits the USB standard signal output from the USB port to the second circuit module, or transmits the USB standard signal to the second external apparatus through the USB port and other ports.

The second circuit module may be mounted on the face of the second printed circuit board, and the USB hub is mounted on the rear side of the second printed circuit board.

BRIEF DESCRIPTION OF THE DRAWINGS

The above and other aspects of the present invention will become apparent and more readily appreciated from the following description of exemplary embodiments, taken in conjunction with the accompanying drawings of which.

DETAILED DESCRIPTION OF EXEMPLARY EMBODIMENTS OF THE INVENTION

Certain exemplary embodiments of the present invention will now be described in greater detail with reference to the accompanying drawings.

Figure 1:
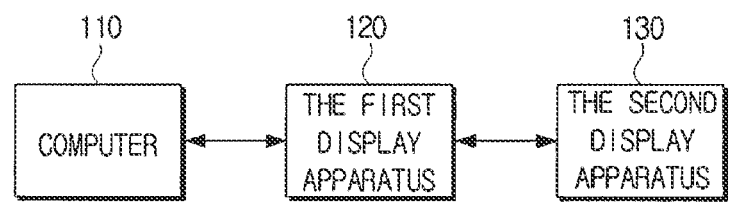
FIG. 1 is a block diagram illustrating a connection relationship of a display apparatus and an external apparatus according to an exemplary embodiment of the present invention.

FIG. 1 is a block diagram illustrating a connection relationship of a display apparatus and an external apparatus according to an exemplary embodiment of the present invention. A first display apparatus 120 may receive video from an external apparatus such as a computer 110 through various ports, display the received video, and transmit the video to a second display apparatus 130. The first display apparatus 120 may transmit various signals such as a video signal, or a text signal, received from the computer 110 to the second display apparatus 130.

Figure 2:
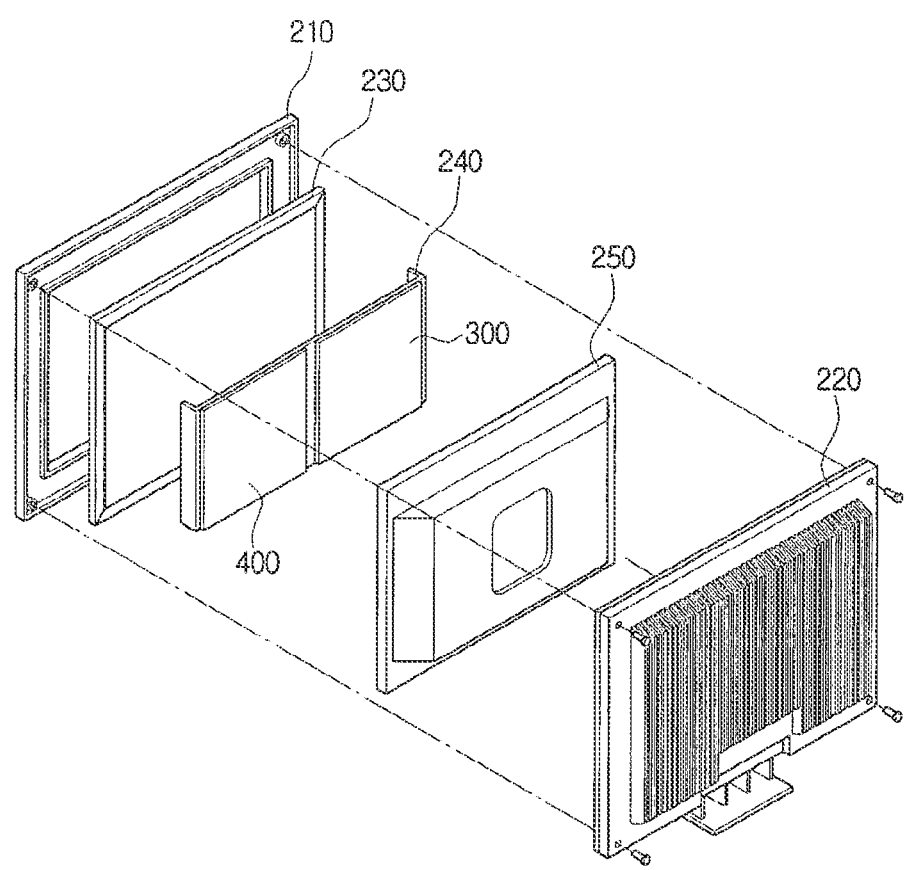
FIG. 2 is an exploded perspective view of a display apparatus according to an exemplary embodiment of the present invention.

FIG. 2 is an exploded perspective view of a display apparatus, such as the first display apparatus of FIG. 1, according to an exemplary embodiment of the present invention. The first display apparatus may comprise a front cover 210, a display module 230, a board supporting frame 240, a first printed circuit board 400, a second printed circuit board 300, a screen cover 250, and a rear cover 200.

A display window is formed on a plate surface of the front cover 210 such that a video signal displayed on the display module 230 is exposed outside. The exterior of the display apparatus 120 is formed by combining the front cover 210 and the rear cover 220 to house the display module 230, the board supporting frame 240, and the screen cover 250 therein.

The display module 230 may be a flat display module such as a liquid crystal display (LCD) module, a plasma display panel (PDP) module, or an organic electro-luminescence (OEL) module.

The board supporting frame 240 according to an exemplary embodiment of the present invention may be engaged to the front cover 210, and at a distance apart from the rear surface of the display module 230.

The first printed circuit board 400 and the second printed circuit board 300 are disposed near the rear surface of the board supporting frame 240. When the second printed circuit board 300 is engaged to the board supporting frame 240, space is ensured between the second printed circuit board 300 and the board supporting frame 240 for the positioning of a circuit element.

When viewed from the back, the first printed circuit board 400 is disposed at the left-rear side of the board supporting frame 240 and the second printed circuit board 400 is disposed at the right-rear side of the board supporting frame 240, in the display apparatus 120 according to an exemplary embodiment of the present invention.

A plurality of power supply circuit elements and an output port 350 may be disposed on the first printed circuit board 400. The plurality of power supply circuit elements supply power to drive the display apparatus 120, and the output port 350 provides power supplied from the power supply circuit elements to the second printed circuit board 300. The output port 350 is connected through a power supply cable to an input port 311.

The second printed circuit board 300 is engaged at the rear surface of the board supporting frame 240, adjacent to the first printed circuit board 400. The second circuit board 300 comprises the first circuit module 320 to transmit and receive a universal serial bus (USB) standard signal to and from an external apparatus such as the computer 110 or the second display apparatus 130, the second circuit module 330 to convert a compressed video signal into a predefined format, the third circuit module 340 to convert at least one among the converted video signal transmitted from the second circuit module 330 and the video signal transmitted from the computer 110 into a displayable video signal, and to transmit the displayable video signal to the display module 230, and the output ports 350.

The first and second printing circuit boards 400 and 300 may alternatively be disposed on a mounting support at the rear side of the front cover 210 or the display module 230, instead of using the board supporting frame 240. Additionally, the screen cover 250 may be integrated with the rear cover 220.

Figure 3:
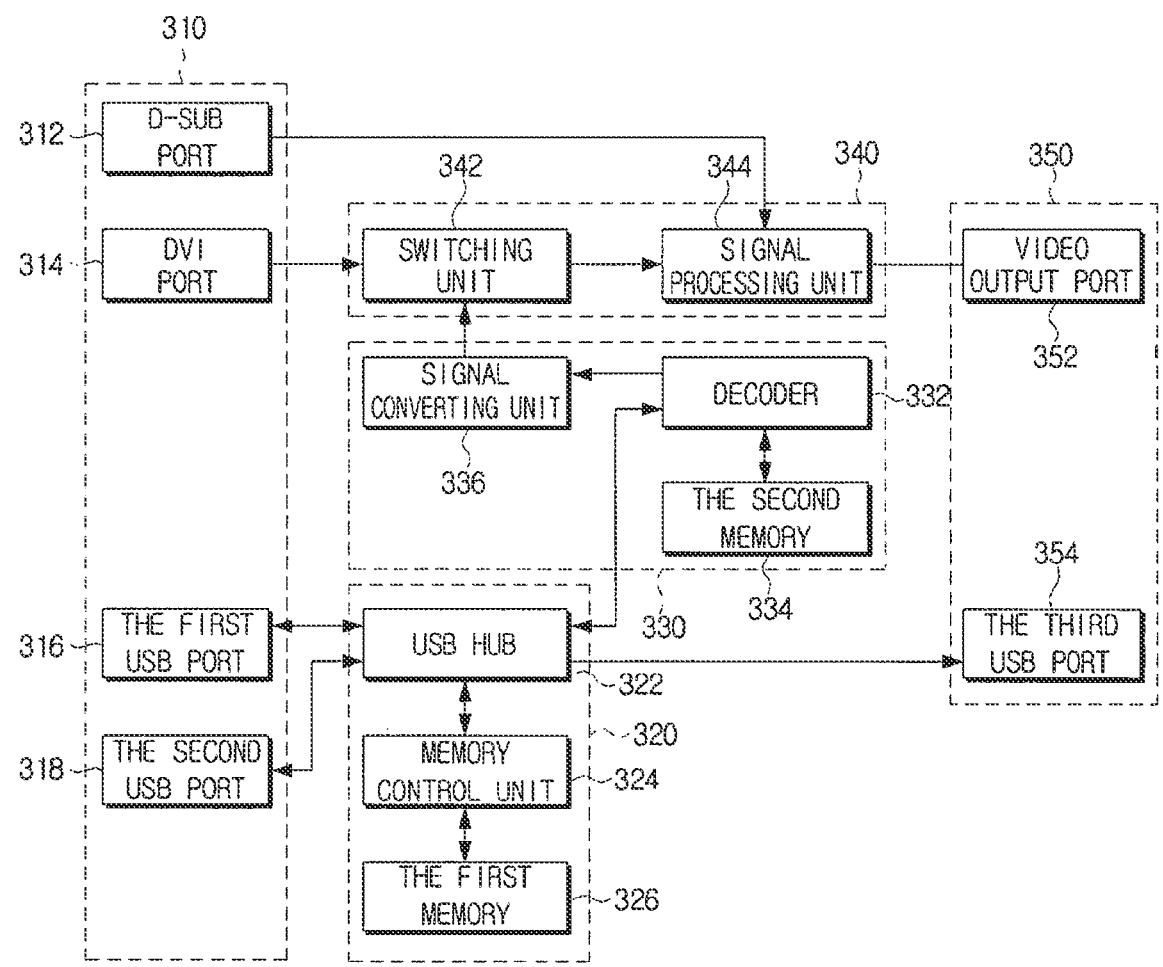
FIG. 3 is a block diagram illustrating a circuit module and input/output ports mounted in a second printed circuit board according to an exemplary embodiment of the present invention.

FIG. 3 is a block diagram illustrating circuit modules 320, 330, and 340, and the input/output ports 310 and 350 mounted in the second printed circuit board 300 according to an exemplary embodiment of the present invention. The second printed circuit board 300 may comprise the first circuit module 320, the second circuit module 330, the third circuit module 340, the input port 310, and the output port 350.

Ports related to the present invention are divided into the input port 310 inputting a signal to the display apparatus 120 and the output port 350 transmitting a signal to the exterior apparatus. The input ports 310 may be at least one among a D-SUB port 312, a digital visual interface (DVI) port 314, a first USB port 316, a second USB port 318, and a power input port (not shown), and the output ports 350 may be at least one among a video output port 352, and a third USB port 354.

The D-SUB port 312 is connected with the computer 110 through a D-SUB cable (not shown), and receives an analogue video signal of D-SUB standard from the computer 110. The D-SUB port 312 comprises many pins, in which i) some of the pins are used to transmit a synchronization signal from the computer 110 to the display apparatus 120, ii) some of the pins are used to transmit a video signal from the computer 110 to the display apparatus 120, and iii) the rest of the pins are used for other uses. The analogue video signal of D-SUB standard may be a red green blue (RGB) standard signal.

The DVI port 314 is connected with the computer 110 through a DVI cable, and receives a digital video signal of DVI standard from the computer 110. The DVI port 314 comprises many pins, in which i) some of the pins are used to transmit clock signals from the computer 110 to the display apparatus 120, ii) some of the pins are used to transmit a video signal and synchronization information from the computer 110 to the display apparatus 120, and iii) the rest of the pins are used for other uses. The digital video signal of a DVI standard may be a Transition Minimized Differential Signaling (TMDS) standard signal.

The first USB port 316 is connected with the computer 110 through a USB cable, and receives a USB standard signal from the computer 110. The first USB port 316 has a difference from the DVI port 314 which is used to receive a video signal from the computer 110, in that the first USB port 316 can receive other signals in addition to the video signal from the computer 110. For example, the first USB port 316 may be used to receive not only a video signal, but also an audio signal, a text signal, a control signal, or others from the computer 110. Although the USB port is capable of two-way communications, the first USB port 316 is classified into an input port in that the USB standard signal transmitted from the computer 120 is transmitted to the display apparatus 120.

The second USB port 318 is connected with an apparatus receiving a user command such as a keyboard, and transmits a signal including the user command to the USB hub 322. The second USB port 318 has a difference from the first USB port 316, in that the second USB port 318 receives signals besides a video signal. The second USB port 318 is classified into the input port, in that the second USB port 318 transmits a signal including a user command to the computer 110 through the display apparatus 120.

The video output port 352 outputs a displayable video signal output through a signal processing unit 344 which will be explained below, to a display module 230. The video output port 352 and the display module 230 are connected with each other using a low voltage differential signaling (LVDS) cable.

The third USB port 354 is connected with the second display apparatus 130 through a USB cable. The third USB port 354 is classified into the output port 350 because the third USB port 354 transmits a USB standard signal output from the USB hub 322 to the second display apparatus 130. The third USB port 354 also can transmit the USB standard signal to the display apparatus 120 as the first and second USB ports 316 and 318, but it will be omitted for convenient description.

The first circuit module 320 transmits and receives a USB standard signal or a display driving program to an external apparatus, and may comprise the USB hub 322, a memory control unit 324, and a first memory 326.

The USB hub 322 transmits a USB standard signal input from the first USB port 316 to a decoder 322 or the third USB port 354. Whether the USB hub 322 transmits the USB standard signal to the decoder 322 or to the third USB port 354 is determined on the basis of information in a packet of the USB standard signal. The USB hub 322 may be a distributor which transmits the USB standard signal input from the first USB port 316 to the decoder 332, the memory control unit 324, and the third USB port 354, respectively.

If the memory control unit 324 retrieves the display driving program stored in the first memory 326, and transmits the retrieved display driving program to the USB hub 322, the USB hub 322 outputs the transmitted display driving program to the computer 110 through the first USB port 316. Accordingly, the computer 110 may set up the display driving program.

The second circuit module 330 converts a video signal among compressed video signals into a predefined format, and may comprise the decoder 332, a second memory 334, and a signal converting unit 336.

The decoder 332 decodes a video signal among the USB standard signal transmitted from the USB hub 322, and transmits the decoded video signal to the signal converting unit 336. The decoded video signal may be a transistor-transistor logic (TTL) standard signal. The second memory 334 provides storage space when the decoder 332 decodes a video signal among the USB standard signal. For example, the second memory 334 may temporarily store the USB standard signal transmitted from the USB hub 322, and transmits the stored USB standard signal to the decoder 332, or may temporarily store the video signal decoded at the decoder 332, and transmit the stored signal to the signal converting unit 336.

The signal converting unit 336 converts the TTL standard signal of the decoded USB video signal into a TMDS standard signal, and transmits the converted signal to a switching unit 342.

The third circuit module 340 processes an inputted video signal into a displayable video signal, and may comprise the switching unit 342, and the signal processing unit 344.

The switching unit 342 switches one of a video signal transmitted from the DVI port 314 and a video signal transmitted from the signal converting unit 336, and outputs the switched signal to the signal processing unit 344. Since the video signal transmitted from the DVI port 314 and the signal converting unit 336 is a TMDS standard, the switching unit 342 transmits one of the video signals to the signal processing unit 344. Accordingly, error of the signal processing unit 344 is prevented.

The switching unit 342 performs a switch operation according to a 'connector priority'. The 'connector priority' determines which of a video signal transmitted from the DVI port 314 and a video signal transmitted from the USB port is displayed. That is, if the USB port has the higher priority than the DVI port 314, and if a video is input to both the DVI port 314 and the USB port, the video input to the USB port is displayed first.

A user may select either a video signal input to the DVI port 314 or a video signal input to the USB port using a select key (not shown) among manipulation devices on the display apparatus 120. The switching unit 342 performs switch operation to display the video signal according to a user selection.

The signal processing unit 344 scales a video signal output from the switching unit 342 or a video signal output from the D-SUB port 312, and performs signal processing to convert the video signal into a displayable video signal. The signal processing unit 344 processes each video signal in a different manner to convert the video signals into an LVDS standard signal of a displayable video signal, depending on the video signal output from the switching unit 342 which is a digital signal, and the video signal output from the D-SUB port 312 which is an analogue signal. The signal processing unit 344 transmits one of the video signals to a video output port.

Even when the signal processing unit 344 receives video signals from the switching unit 342 and the D-SUB port at the same time, the signal processing unit 344 transmits only one of the video signals to the video output unit at a given time. Accordingly, the signal processing unit 344 outputs a video according to the priority as in the switching unit 342. The priority may be arranged by a user selection or a manufacturer of the display apparatus 120.

Figure 4A:
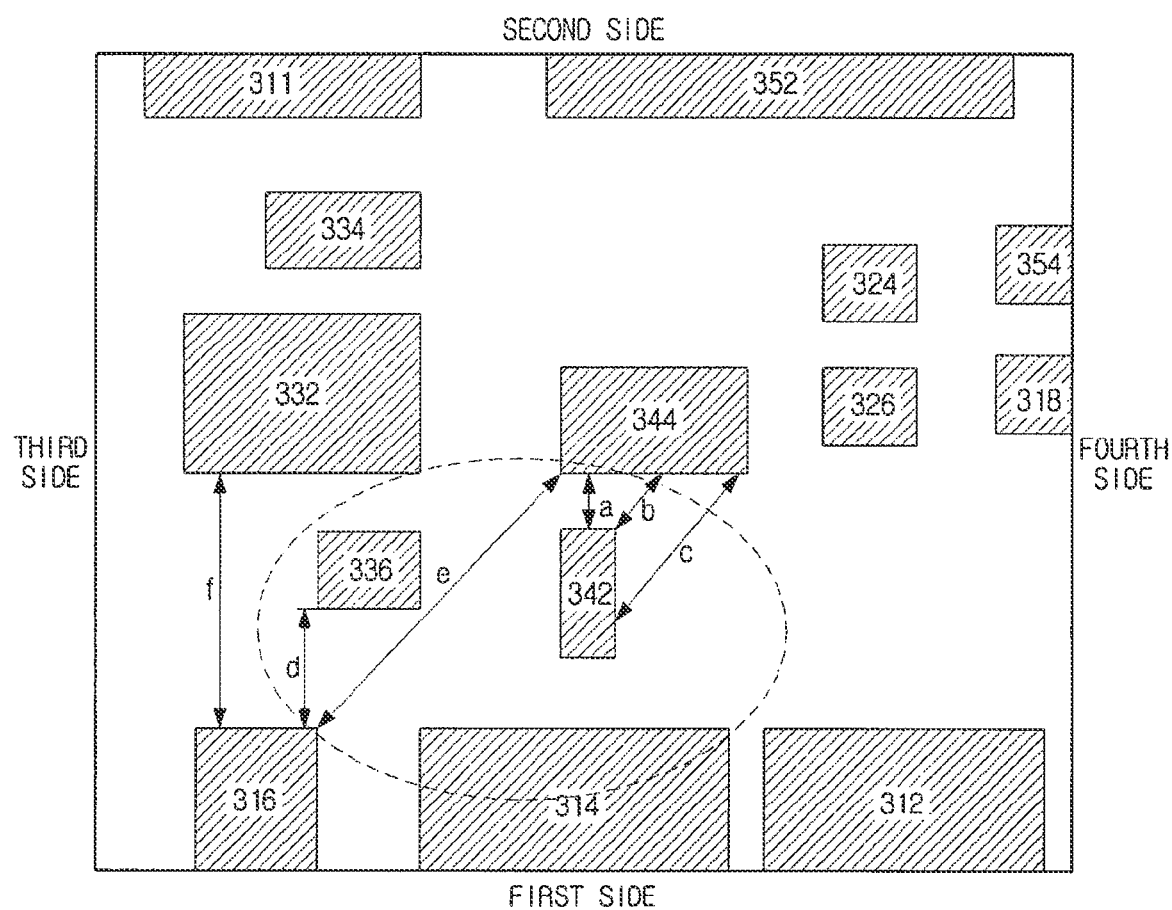
FIGS. 4A and 4B are views illustrating a layout of a first circuit module, a second circuit module, a third circuit module, and input/output ports mounted on a second printed circuit board of a display apparatus according to an exemplary embodiment of the present invention.
Figure 4B:
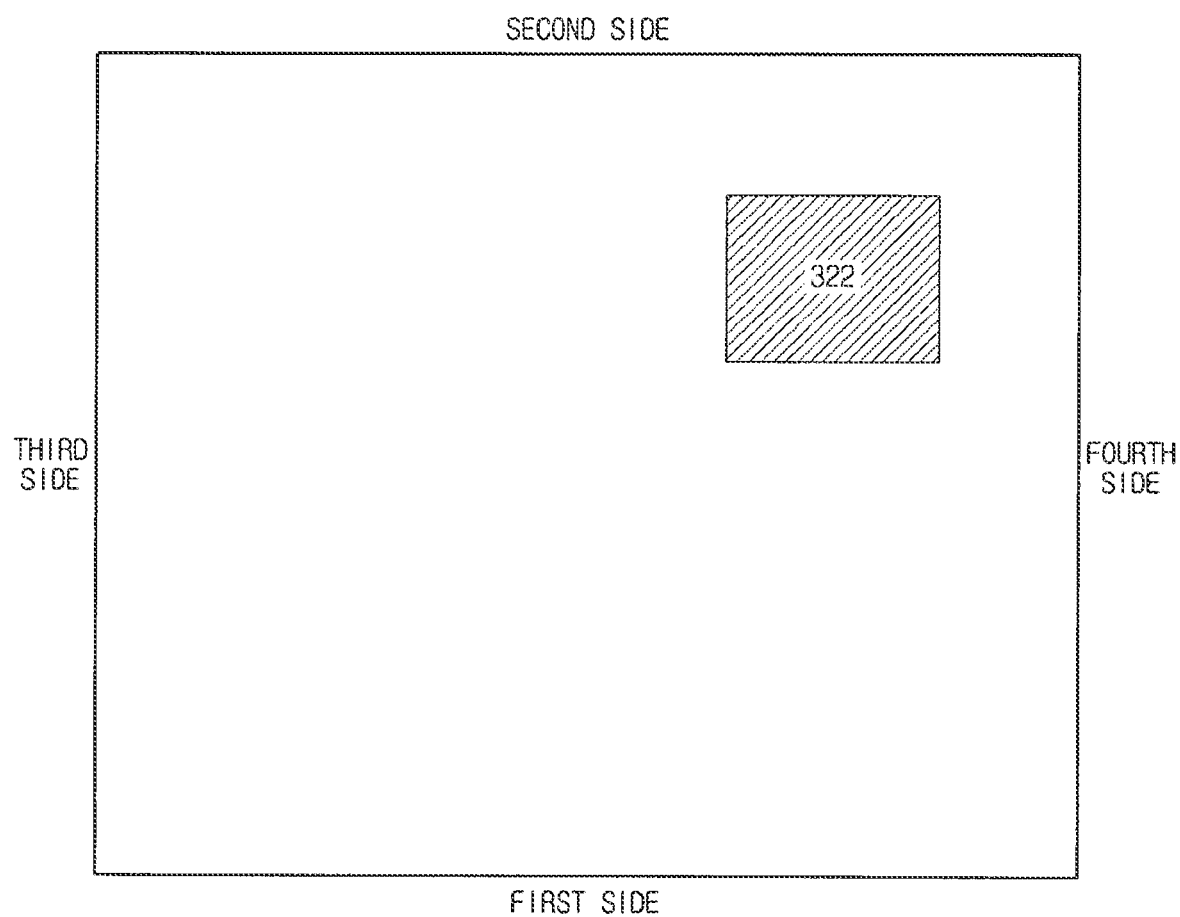

FIGS. 4A and 4B are views illustrating a layout of the first circuit module 320, the second circuit module 330, the third circuit module 340, and the input/output ports, which are mounted on the second printed circuit board 300. FIG. 4A is a view illustrating a layout of the first circuit module 320, the second circuit module 330, the third circuit module 340, and the input/output ports, which are mounted on the face of the second printed circuit board 300, and FIG. 4B is a view illustrating layout of the USB hub 322 among the first circuit module 320 mounted on the back of the second printed circuit board 300.

A surface of the second circuit board 300 opposite to the board supporting frame 240 is referred to as a back, and a reverse surface of the second circuit board 300 is referred to as a face for convenient description. If the second printed circuit board 300 is mounted to the display apparatus 120, it is supposed that a side of the second printed circuit board 300 contacting the bottom of the display apparatus 120 is a first side, a side of the second printed circuit board 300 contacting the top of the display apparatus 120 is a second side, a side of the second printed circuit board 300 nearest to the first printed circuit board 400 is a third side, and a side opposite to the third side is a fourth side.

Also in the following description, an 'interval' between the circuit elements refers to a minimum distance from a predefined point of a circuit element to a predefined point of another circuit element. For example, there may be several distances a, b, c measured from several points of the signal processing unit 344 to several points of the switching unit 342 as illustrated in FIG. 4A. However, the minimum distance from the signal processing unit 344 to the switching unit 342 is distance 'a', according to an exemplary embodiment of the present invention. When the circuit elements are 'adjacently disposed', this means that there is no element between the circuit elements. Therefore, if there is no circuit element mounted on the interval between the circuit elements, it is referred that the elements are adjacently mounted.

Referring to FIG. 4A, input/output ports are disposed at the edge of the four sides of the second printed circuit board 300. The input port 311 to receive power from the first printed circuit board 400 is disposed in the edge area of the second side and adjacent to the first printed circuit board 400. Accordingly, the input port 311 is conveniently connected with the output port 350 mounted on the first printed circuit board 400 through a power cable. The input port 311 may also be mounted at the edge of the third side.

The first USB port 316, DVI port 314, and the D-SUB port 312 may be arranged in a sequence. Although the arrangement of the first USB port 316, DVI port 314, and the D-SUB port 312 may be changed, it is desirable that the input ports are adjacently disposed at the edge of the first side in a row. Additionally, it is desirable that the first USB port 316 and the DVI port 314 are always arranged adjacent to each other.

The second circuit module 330 is disposed in the edge area of the third side of the second circuit board 300. That is, the decoder 332, the second memory 334, and the signal converting unit 336 included in the second circuit module 330 are adjacently disposed at the edge of the third side of the second circuit board 300 and above the first USB port 316, so as to be closest to the first printed circuit board 400. The decoder 332, the second memory 334, and the signal converting unit 336 may be disposed from the bottom in a sequential order. Since the area of the decoder 332 on the second printed circuit board 300 is larger than that of the signal converting unit 336, the decoder 332 may be disposed above the signal converting unit 336, and since the second memory 334 provides storage space for operation of the decoder 332, the second memory 334 my be disposed near of the decoder 332.

The decoder 332 which decodes a USB standard signal input from the first USB port 316, and the signal converting unit 336 are disposed adjacent to the first USB port 316 such that efficiency of signal processing may be improved.

The third circuit module 340 which converts a video signal into a displayable video signal may be disposed to the left of the first circuit module 320 and above the DVI port 314. The switching unit 342 of the third circuit module 340 may be disposed to the right of the signal converting unit 336 and above the DVI port 314.

Since the switching unit 342 switches either a video signal output from the signal converting unit 336 or a video signal output from the DVI port 314, and transmits the switched signal to the signal processing unit 334, the switching unit 342 may be adjacent to the signal converting unit 336 and the DVI port 314 respectively. The switching unit 342 may be disposed between the first USB port 316 and the signal processing unit 344. More particularly, when the switching unit 342 may be disposed in a triangular area or the circular area defined by the first USB port 316, the DVI port 314, and the signal processing unit 344.

The signal processing unit 344 may be disposed above the switching unit 342 and left of the decoder 332, and the video output unit may be disposed above the signal processing unit 344 and near the edge of the fourth side. The video output unit transmits a video output from the signal processing unit 344 to the display module 230 such that the video output unit may be adjacent to the signal processing unit 344. Also, the decoder 332, the signal converting unit 336, and the signal processing unit 344 may instead be mounted in the first printed circuit board 400.

Referring to FIGS. 4A and 4B, the first circuit module 320 is mounted at the face and back of the second printed circuit board 300 such that a space of the second printed circuit board 300 may be used efficiently. For example, the memory control unit 324 and the first memory 326 are vertically arranged to the right of the signal processing unit 344 on the face of the second printed circuit board 300, and the USB hub 322 is mounted on the back of the second printed circuit board 300 corresponding to the mounting area of the memory control unit 324. Along with the USB hub 322, the memory control unit 324, the first memory 326, the second USB port 318, and the third USB port 354 may also be mounted on the back side of the second printed circuit board 300.

The second USB port 318, and the third USB port 354 are adjacently mounted at the edge of the fourth side.

A distance between circuit elements mounted on the second printed circuit board 300 will be explained in detail.

A USB standard signal output from the first USB port 316 is sequentially converted through the decoder 332 and the signal converting unit 336, the converted signal is converted into a displayable video signal in the signal processing unit 344. Accordingly, the decoder 332, the signal converting unit 336, and the signal processing unit 344 may be adjacently arranged.

A distance (d) between the first USB port 316 and the signal converting unit 336 may be shorter than a distance (e) between the first USB port 316 and the signal processing unit 344, and a distance (f) between the first USB port 316 and the decoder 332 may be shorter than the distance (e) between the first USB port 316 and the signal processing unit 344.

Figure 5:
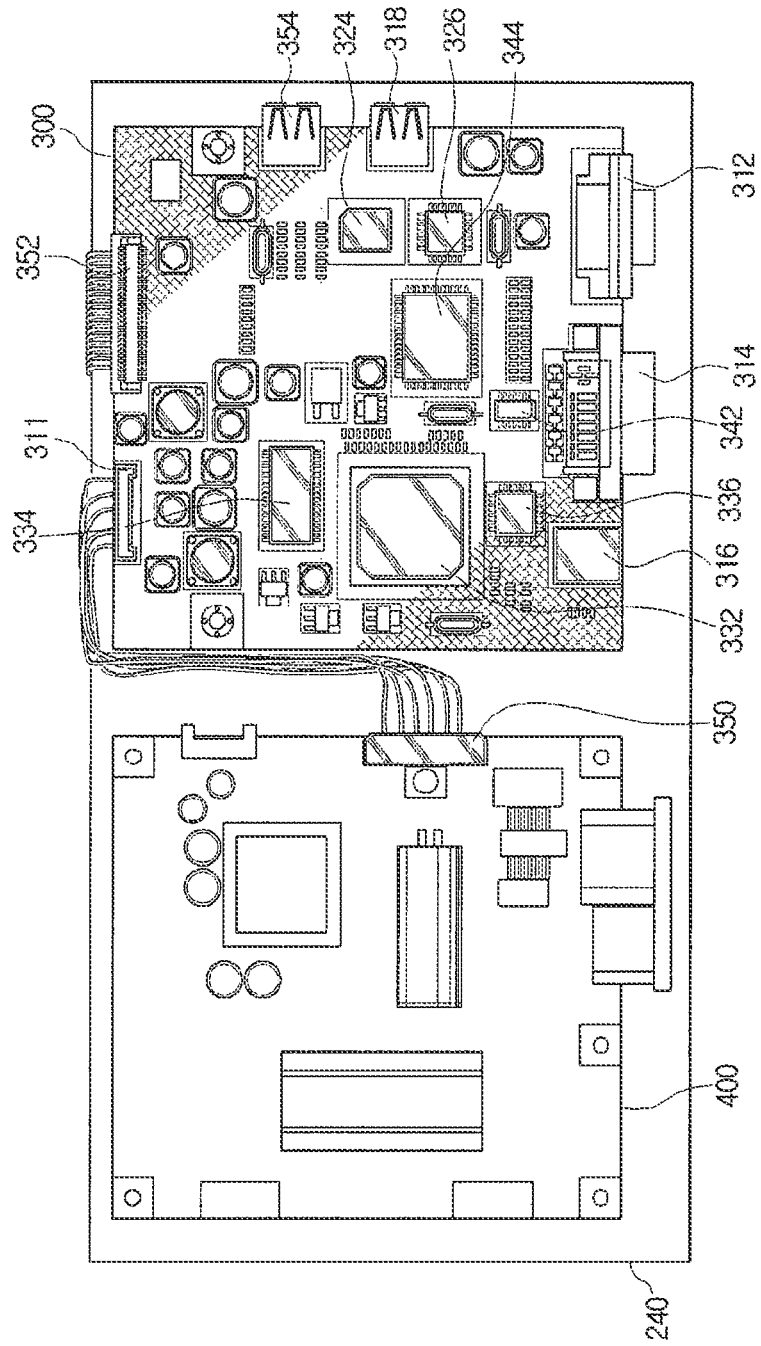
FIG. 5 is a view wherein a first printed circuit board and a second printed circuit board of a display apparatus are engaged on a board supporting frame, according to an exemplary embodiment of the present invention.

FIG. 5 is a view wherein the first printed circuit board 400 and the second circuit board 300 of a display apparatus are engaged on a board supporting frame 240. The first printed circuit board 400 and the second printed circuit board 300 are adjacently mounted on the board supporting frame 240. The output port 350 of the first printed circuit board 400 is connected with the power input port 311 of the second printed circuit board 300 through a power supply cable, and the video output unit of the second printed circuit board 300 is connected with the display module 230 through a video supply cable. Elements illustrated in FIG. 5 are described in FIGS. 2 to 4, and thus a description thereof will be omitted.

It is explained that in exemplary embodiments of the present invention that the first USB port 316 receives a video signal input, the second USB port 318 outputs the video signal, and the third USB port 354 inputs and outputs signals, other than video signals, but the functions are not limited thereto. A USB port may perform bi-directional serial communication such that each USB port may perform as an input/output port.

A display apparatus according to exemplary embodiments of the present invention may receive a video from an external apparatus such as a computer through a USB port in addition to a DVI port and D-SUB port, and display the received video. Display apparatuses having additional ports to the DVI ports and D-SUB ports may be connected to a computer without requiring additional hardware. Additionally, a computer and a display apparatus may be connected using a USB cable which is cheaper as it requires less lines than the DVI cable or the D-SUB cable. Furthermore, because associated circuit elements, among the circuit elements mounted on a board are adjacently arranged, noise is reduced.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A television apparatus comprising:
a display module;
a board coupled to the display module,
wherein the board comprises:
a video input port which receives a first video signal;
a universal serial bus (USB) port which receives a second video signal;
a signal processing unit which processes at least one of the first video signal and the second video signal into the displayable video signal;
a video output port which outputs the displayable video signal to the display module, the displayable video signal corresponding to either the first video signal or the second video signal,
wherein the USB port is disposed adjacent to a first side edge of the board, and the video output port is disposed adjacent to a second side edge of the board which is different from the first side edge of the board, and
wherein the USB port and the video input port are adjacently disposed, and the first side edge and the second side edge are opposite to each other.

2. The television apparatus of claim 1, wherein the video input port is a least one of a digital visual interface (DVI) port and a D-subminiature connectors (D-SUB) port.

3. The television apparatus of claim 1, further comprising:
a signal converting unit which converts the second video signal into a third video signal; and
wherein a decoder, the signal converting unit, and the signal processing unit are adjacently disposed on the board.

4. The television apparatus of claim 3, wherein the third video signal is a Transition Minimized Differential Signaling (TMDS) format signal.

5. The television apparatus of claim 3, wherein the displayable video signal is a low voltage differential signaling (LVDS) format signal.

6. The television apparatus of claim 3, wherein a distance between the USB port and the signal converting unit is shorter than a distance between the USB port and the signal processing unit.

7. The television apparatus of claim 3, comprising:
a switching unit which outputs one of the first video signal transmitted from the video input port and the third video signal transmitted from the signal converting unit to the signal processing unit,
wherein the switching unit is mounted on the board, and disposed between the USB port and the signal processing unit.

8. The television apparatus of claim 1, wherein a distance between a center of a display apparatus and the USB port is shorter than a distance between the center of the display apparatus and the video input port.

9. The television apparatus of claim 1, further comprising:
a decoder which decodes the second video signal and outputs the decoded second video signal,
wherein a distance between the USB port and the decoder is shorter than a distance between the USB port and the signal processing unit.

10. The television apparatus of claim 1, wherein the board is disposed behind the display module.

11. A display apparatus having a display module, the display apparatus comprising:
a first printed circuit board which is disposed behind the display module, and comprises a plurality of power supply circuit elements;
a second printed circuit board which is disposed adjacent to the first printed circuit board;
wherein the second printed circuit board comprises:
a port which receives a first video signal from an external apparatus;
a first circuit module which transmits and receives a universal serial bus (USB) standard signal to and from the external apparatus;
a second circuit module which decodes a second video signal from the USB standard signal and outputs a decoded second video signal; and
a third circuit module which converts at least one of the first video signal and the second video signal into a displayable video signal, and which transmits the displayable video signal to the display module,
wherein the first circuit module is disposed adjacent to a first side edge of the second printed circuit board, and the port is disposed adjacent to a second side edge of the second printed circuit board which is different from the first side edge of the second printed circuit board, and
wherein the first circuit module and the port are adjacently disposed, and the first side edge and the second side edge are opposite to each other.

12. The display apparatus of claim 11, wherein the second circuit module comprises:
a decoder which decodes the second video signal from the USB standard signal output from a USB port of the first circuit module; and
a signal converting unit which converts the decoded second video signal output from the decoder,
wherein the decoder, and the signal converting unit are sequentially arranged from top to bottom of the second printed circuit board.

13. The display apparatus of claim 11, wherein the third circuit module comprises:
a switching unit which outputs at least one of the first video signal output from a digital visual interface (DVI) port and a second video signal output from the second circuit module; and
a signal processing unit which converts at least one of the first and second video signals output from the switching unit into the displayable video signal,
wherein the switching unit is disposed in an area defined by the DVI port, the USB port and the signal processing unit.

14. The display apparatus of claim 11, wherein the first circuit module is mounted on a different surface from a surface of the second printed circuit board mounting the third circuit module.

15. The display apparatus of claim 14, wherein the first circuit module comprises:
a USB hub which transmits the USB standard signal output from the USB port to the second circuit module, or transmits the USB standard signal to the external apparatus through the USB port and other ports.

16. The display apparatus of claim 15, wherein the second circuit module is mounted on a face of the second printed circuit board, and the USB hub is mounted on a rear side of the second printed circuit board.

* * * * *